Aug. 24, 1943.   H. A. FINK   2,327,412
CONTAINER WITH HEATING MEANS
Filed Aug. 9, 1941   2 Sheets-Sheet 1
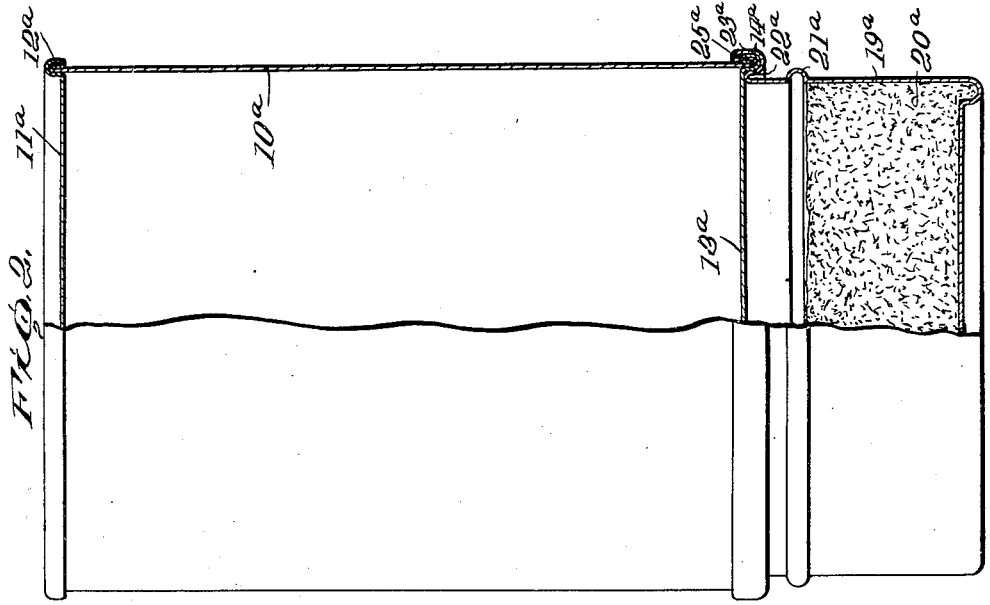
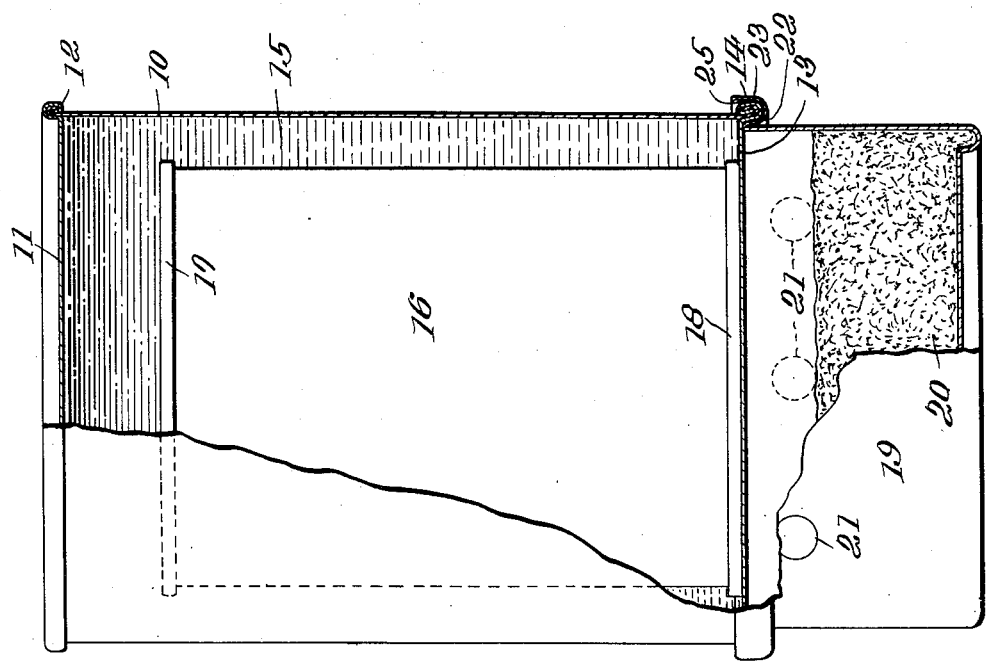
INVENTOR
Henry A. Fink
Mason & Porter
ATTORNEYS Aug. 24, 1943.   H. A. FINK   2,327,412
CONTAINER WITH HEATING MEANS
Filed Aug. 9, 1941   2 Sheets-Sheet 2
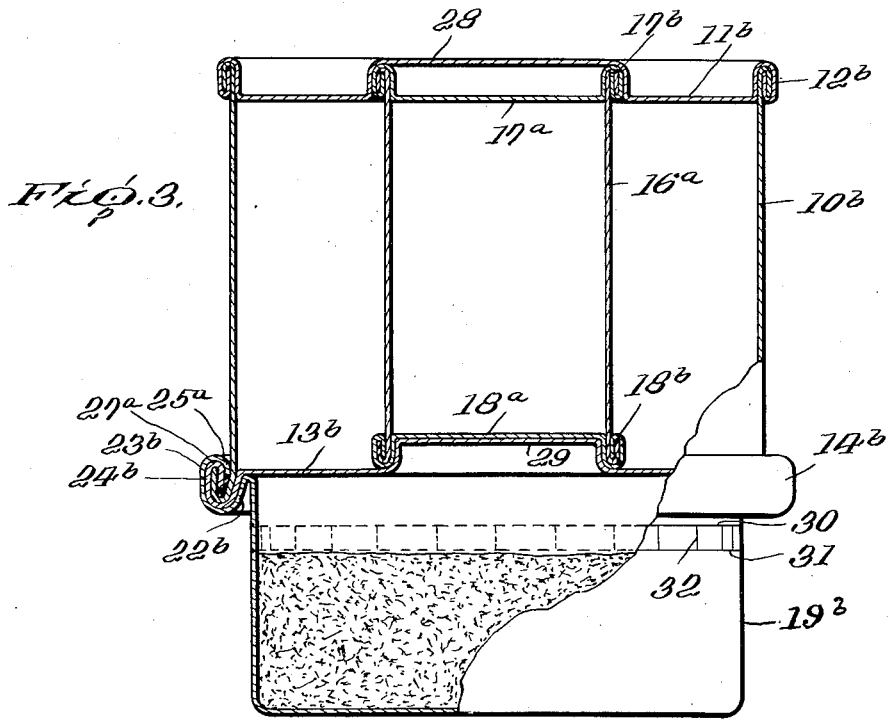
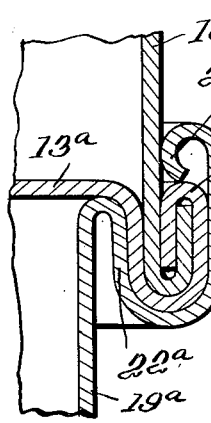
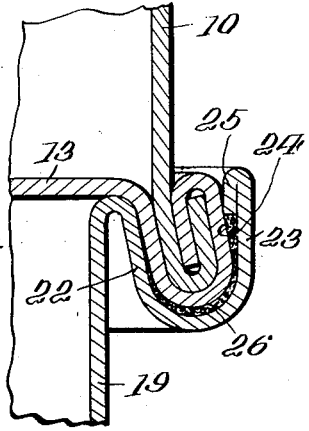
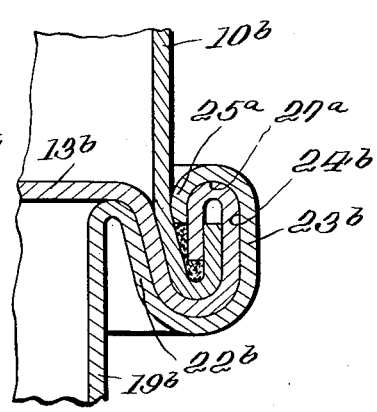
INVENTOR
Henry A. Fink
By
Mason & Porter
ATTORNEYS Patented Aug. 24, 1943

2,327,412

UNITED STATES PATENT OFFICE 2,327,412

CONTAINER WITH HEATING MEANS

Henry A. Fink, Pelham Manor, N. Y., assignor to Continental Can Company, Inc., New York, N. Y., a corporation of New York Application August 9, 1941, Serial No. 406,227

2 Claims. (Cl. 220—4)

The present invention relates to new and useful improvements in containers, and more particularly to improvements in a sheet metal container having heating means associated therewith.

In general, the invention contemplates the provision of a container assembly having an upper compartment for the contents which are adapted to be heated, and a lower compartment for holding an inflammable material which can be ignited in order to heat the contents of the upper compartment. More specifically, the container assembly includes an upper container having a body wall with top and bottom ends secured thereto by double seams. The assembly also includes a bottom or lower container which is attached to the bottom of the upper container and which is adapted to hold the inflammable material. The wall of the bottom container is scored or otherwise shaped to provide well defined portions which may be punctured or removed for affording necessary air and flame openings. In the case of dry food products, an inner container for such food products is placed within the upper container and is substantially immersed in a heat transferring liquid, such as water. However, in the case of liquid food products, the inner dry food container can be omitted and the liquid food products placed directly in the upper container. The food containers are of the conventional type which are hermetically sealed, as is the lower container for the inflammable material.

An object of the invention is to provide a container assembly of the above type wherein the connection between the upper and lower containers is facilitated by the provision of interengaging means therebetween.

A further object of the invention is to provide a container assembly of the above type wherein the bottom container for the inflammable material is directly attached to the double seam at the bottom of the upper container and hermetically sealed.

A still further object of the invention is to provide a container assembly of the above type wherein the inner container for dry food products is centered with respect to the upper container so as to prevent relative shifting therebetween.

The above and other objects of the invention will in part be obvious and will be hereinafter more fully pointed out.

In the accompanying drawings:

Figure 1 is a side view, partly in section, showing one form of container assembly with a container for dry food products disposed within the upper container.

Figure 2 is a similar side view, partly in section, showing a further form of container assembly with the inner container omitted.

Figure 3 is a side view, partly in section, showing a further form of container assembly with the inner container centered with respect to the outer container.

Figure 4 is an enlarged fragmentary sectional view showing the connection between the upper and lower containers of Figure 1.

Figure 5 is an enlarged fragmentary sectional view showing the connection between the upper and lower containers of Figure 2.

Figure 6 is an enlarged fragmentary sectional view showing the connection between the upper and lower containers of Figure 3.

In the form of the invention shown in Figure 1, the upper compartment is in the form of a container which includes a body portion 10 having a top end 11 which is secured thereto by a conventional double seam 12. A bottom end 13 is also secured to the body wall by a conventional double seam 14. In this form of the invention, the upper container is adapted to hold a liquid, such as water 15, broth or the like, and an inner container 16 is disposed within the outer container and is thus substantially immersed in the liquid 15. The inner container 16 is of the conventional type which includes a top end 17 and a bottom end 18 which are secured to the body wall by a hermetic seal. This inner container may be employed for holding semi-dry solid food products or the like.

The bottom compartment is in the form of a container 19 which is adapted to hold any suitable type of inflammable material 20 and the peripheral wall of this bottom container is provided with a plurality of scored circular portions 21 which may be punched through or removed for providing necessary air and flame openings. The top of the wall portion of the bottom container is adapted to be directly connected to the double seam 14 at the bottom of the upper container and this connection is more particularly shown in Figure 4. Thus, the upper edge of the wall portion 19 of the bottom container is directed outwardly and downwardly, as at 22, to lie immediately adjacent the inner edge of the double seam 14. The downwardly turned portion 22 is then directed outwardly and upwardly, as at 23, to provide an outer wall portion which overlies the outer surface 24 of the double seam 14. As shown in Figure 4, the entire double seam 14 is slightly bent outwardly so as to incline the outer surface 24 outwardly and downwardly. The free edge of the portion 23 is bent inwardly upon itself, as at 25, to provide a surface which is adapted to engage and abut against the outer surface 24 of the double seam. There is thus provided an interengaging connection between the bottom container and the double seam at the bottom of the upper container. A suitable sealing compound 26 is employed between the double seam 14 and the inner surface of the outwardly directed portions of the bottom wall so as to provide a hermetic seal for the bottom container.

In the form of the invention shown in Figure 2, the upper container includes a body wall 10a having a top end 11a secured thereto by a conventional double seam 12a. A bottom end 13a is also secured and hermetically sealed to the body wall 10a by a conventional double seam 14a. In this form of the invention, the inner container 16 (Figure 1) is omitted and the entire upper container can be employed for holding a liquid or semi-liquid food product.

The bottom container 19a includes a peripheral and outwardly extending rib 21a located below the connection with the upper container and this rib may be punctured at intervals by any suitable sharp instrument for providing the necessary air and flame openings. As more clearly shown in Figure 5, the top edge of the bottom wall 19a is directed outwardly and downwardly, as at 22a, and then outwardly and upwardly, as at 23a, to substantially overlie and enclose the double seam 14a. The top edge of the portion 23a is curled inwardly to provide a bead 25a which is adapted to engage the top outer surface 27 of the double seam 14a. There is thus provided a positive interlocking engagement between the wall of the bottom container and the double seam at the bottom of the upper container and a suitable sealing compound may be employed for hermetically sealing the bottom container.

As shown in Figure 3, the upper container includes a body wall 10b having a top end 11b secured thereto by a conventional double seam 12b. A bottom end 13b is also secured to the body wall 10b by a double seam 14b. In this form of the invention, the upper container may be employed for holding a liquid, as described in connection with Figure 1, but the inner container 16a is centered with respect to the outer container 10b. The inner container 16a may be employed for dry food products and includes a top end 17a and a bottom end 18a, both of which are secured to the body wall 16a by conventional double seams 17b, 18b, respectively. The top end 11b of the outer container 10b is provided with a central elevated portion 28 which is adapted to overlie and snugly fit the double seam 17b on the inner container so as to center the inner container with respect to the outer container. This construction will of itself be sufficient to center the inner container with respect to the outer container but as an alternative, the bottom end 13b of the outer container may also be provided with an elevated block portion 29 which snugly fits within the double seam 18b on the inner container and this construction will also serve to positively center the inner container with respect to the outer container.

The peripheral body wall 19b of the bottom container is provided with upper and lower peripheral score lines 30, 31, respectively, and with a plurality of vertical score lines 32 extending between the upper and lower score lines. Thus, there is provided a plurality of peripheral sections defined by the score lines and alternate sections may be removed for providing the necessary air and flame openings. In this form of the invention, the bottom container is secured to the upper container by the connection which is more clearly shown in Figure 6. In this form of connection, the free edge of the body wall is bent outwardly and downwardly, as at 22b, and then outwardly and upwardly as at 23b. The adjacent inner edges of the body wall 10b and the bottom end 13b are inclined downwardly and outwardly but the outer edge 24b of the double seam 14b is disposed substantially vertically. The free edge of the portion 23b is curled inwardly around the top edge 27a of the double seam 14b which is thus completely enclosed. This inwardly curled free edge 25a thus completes the enclosure of the double seam and provides a positive interlocking engagement for connecting the bottom container with the upper. Here again, a suitable sealing compound may be employed in the double seam and in the connection between the bottom container and the upper container for providing a hermetic seal for the bottom container.

From the foregoing description, it will be seen that the present invention provides an extremely simple and compact container which has heating means conveniently associated therewith. In all forms of the invention, a conventional type of upper container is employed and the bottom end is secured thereto by a double seam. The wall portion of the fuel container is shaped to provide outwardly extending flange means which positively and directly engage the outward bead at the bottom of the upper container. This form of assembly greatly facilitates the connection between the upper and lower containers.

In using the container of Figure 1, the top end 11 is removed in a well-known manner before the inflammable material is ignited. After removal of the top end, the scored portions 21 in the bottom container may be removed so as to permit igniting of the fuel or other inflammable material contained therein. Removal of the scored portions thus provides necessary air and flame openings so that the heat is transmitted by the liquid to the contents of the inner container 16. After the desired heating, the inner container can be quickly withdrawn and the contents thereof removed. According to the form of the invention shown in Figure 2, the upper and outer container 10a is employed for holding liquid or semi-liquid food products which are directly contained therein. In this form of container, the rib 21a can be punctured by a sharp tool at intervals so as to provide the necessary air and flame openings. In the form of the invention shown in Figure 3, the top end 11b is also removed so as to facilitate rapid withdrawal of the inner container after heating thereof. Alternate sections between the horizontal and vertical score lines can be removed for providing the air and flame openings for heating the contents of the upper container.

According to Figure 4, the entire double seam 14 at the bottom of the upper container is inclined outwardly so as to provide an inclined outer surface 24 against which the folded portion 25 of the flange means is adapted to positively abut so as to firmly attach the upper and lower containers. In the connection shown in Figure 5, the flange on the bottom container is provided with an inwardly directed bead 25a which overlies and engages the top surface 27 of the double seam 14a. In the connection shown in Figure 6, the edge of the portion 23b is curled around the top edge 27a of the double seam 14b so as to provide a positive connection between the upper and bottom containers. In all forms of the invention, a sealing compound is employed for hermetically sealing the containers and positive engagement between the flange means on the bottom container and the double seam at the bottom of the upper container is provided. In Figures 5 and 6, the double seam is completely enclosed by the flange means, whereas in Figure 4, only the outer edge of the double seam is enclosed but in each case, there is positive engagement between the flange means and the double seam so as to provide an interlocking connection.

It is to be clearly understood that minor changes in the details of construction and arrangement of parts may be made without departing from the scope of the invention as set forth in the appended claims.

I claim:

1. A sheet metal container assembly comprising an upper container including a body portion, end members secured thereto by double seaming, said bottom end member having a depression therein adjacent the double seam joining the said end of the body, and a lower container including a body portion having a closed bottom end, said body portion having a laterally projecting flange bent downwardly, outwardly and thence upwardly and dimensioned so as to conform to the double seam joining the bottom end to the body on the upper container, said upwardly extending portion being shaped so as to contact with the double seam and join said lower container in sealed engagement to the upper container.

2. A sheet metal container assembly comprising an upper container including a body portion, end members secured thereto by double seaming, said bottom end member having a depression therein adjacent the double seam joining the said end to the body, and a lower container including a body portion dimensioned so as to extend into said recess in the bottom end of the upper container and form a supporting means therefor, the wall of said lower container at the upper end thereof being folded outwardly, thence downwardly, again outwardly and upwardly to conform snugly to the double seam joining the bottom end of the upper container to the body thereof, said upwardly extending portion of the flange being shaped so as to contact with the outer wall of the double seam and join the lower container in sealed engagement to the upper container.

HENRY A. FINK.